United States Patent
Waite et al.

(10) Patent No.: US 9,037,314 B2
(45) Date of Patent: May 19, 2015

(54) UAV POWER LINE POSITION AND LOAD PARAMETER ESTIMATION

(75) Inventors: James W. Waite, Los Gatos, CA (US); Thorkell Gudmundsson, San Jose, CA (US); Dimitar Gargov, Merced, CA (US)

(73) Assignee: Optimal Ranging, Inc., Santa Clara, CA (US)

( * ) Notice: Subject to any disclaimer, the term of this patent is extended or adjusted under 35 U.S.C. 154(b) by 102 days.

(21) Appl. No.: 13/164,611

(22) Filed: Jun. 20, 2011

(65) Prior Publication Data

US 2012/0016538 A1 Jan. 19, 2012

Related U.S. Application Data

(60) Provisional application No. 61/356,810, filed on Jun. 21, 2010.

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *G01C 23/00* | (2006.01) |
| *G01C 21/20* | (2006.01) |
| *G05D 1/10* | (2006.01) |

(52) U.S. Cl.
CPC ........... *G01C 21/20* (2013.01); *B64C 2201/141* (2013.01); *G05D 1/101* (2013.01)

(58) Field of Classification Search
CPC .................................................. B64C 2201/00
USPC ..................... 701/3, 300; 324/76.39, 330, 331
See application file for complete search history.

(56) References Cited

U.S. PATENT DOCUMENTS

| | | | |
|---|---|---|---|
| 6,483,309 B1* | 11/2002 | Gripshover et al. | 324/331 |
| 6,922,059 B2 | 7/2005 | Zank et al. | |
| 7,356,421 B2 | 4/2008 | Gudmundsson et al. | |
| 7,443,154 B1* | 10/2008 | Merewether et al. | 324/67 |
| 7,543,780 B1* | 6/2009 | Marshall et al. | 244/194 |
| 7,701,196 B2* | 4/2010 | Hull et al. | 324/76.77 |
| 2003/0178982 A1* | 9/2003 | Elms | 324/76.38 |

(Continued)

OTHER PUBLICATIONS

ISR and Written Opinion for related PCT Application No. PCT/US2011/041112, dated Nov. 14, 2011.

(Continued)

*Primary Examiner* — Yonel Beaulieu
*Assistant Examiner* — Lail Kleinman
(74) *Attorney, Agent, or Firm* — Haynes and Boone, LLP

(57) ABSTRACT

A system and method for providing autonomous navigation for an Unmanned Air Vehicle (UAV) in the vicinity of power lines is presented. Autonomous navigation is achieved by measuring the magnitude and phase of the electromagnetic field at an unknown location within a space under excitation by a set of power cables of the power line with one or more orthogonal electromagnetic sensors formed on the UAV; modeling a set of expected complex electromagnetic strengths of the set of power cables at the currently estimated position and orientation of the UAV based on a model of the set of power cables; and estimating parameters related to a position and orientation of the UAV, and load parameters of each cable based on the residual error between the measured set of complex electromagnetic field values and the set of expected electromagnetic field values corresponding to a combined model of the set of power cables.

20 Claims, 5 Drawing Sheets

(56) References Cited

U.S. PATENT DOCUMENTS

| | | | | |
|---|---|---|---|---|
| 2005/0046608 | A1* | 3/2005 | Schantz et al. | 342/127 |
| 2005/0096879 | A1* | 5/2005 | Waite et al. | 702/189 |
| 2005/0159929 | A1* | 7/2005 | Overby et al. | 702/189 |
| 2006/0009887 | A1* | 1/2006 | Rubin et al. | 701/9 |
| 2006/0055584 | A1* | 3/2006 | Waite et al. | 342/22 |
| 2006/0267833 | A1* | 11/2006 | Langford et al. | 342/174 |
| 2009/0128156 | A1* | 5/2009 | Li et al. | 324/326 |

OTHER PUBLICATIONS

International Preliminary Report on Patentability and the Written Opinion mailed Jan. 10, 2013, in related International Application No. PCT/US2011/041112.

Moore, J. and Tedrake, R., "Powerline Perching with a Fixed-Wing UAV", Proceedings of the AIAA Infotech@Aerospace Conference, Seattle, WA, Apr. 2009.

Sanford, T., and Tyler, R., "Nearshore Navigation and Communication Based on Deliberate EM Signals", Applied Physics Laboratory, University of Washington, Apr. 2005.

Olsen, R., "Calculations of ELF Electric and Magnetic Fields in Air", Proceedings of EMF Engineering Review Symposium, Charleston, SC, Apr. 28-29, 1998.

Blackledge, J. M., Digital Signal Processing: mathematical and computational methods, software development, and applications, Horwood Publishing, 2003, pp. 128-131.

Miller, K.S., and M.M. Rochwarger, "A covariance approach to spectral moment estimation", IEEE Trans. Info. Theory, IT-18, 588-596, Sep. 1972.

Simon, D., "Optimal State Estimation: Kalman, H Infinity, and Nonlinear Approaches", Wiley-Interscience, Chapter 13, pp. 395-425, 2006.

Wan, E.A. and van der Merwe, R., "The Unscented Kalman Filter for Nonlinear Estimation", Adaptive Systems for Signal Processing, Communications, and Control Symposium, IEEE, 2000.

\* cited by examiner

… (US 9,037,314 B2)

UAV POWER LINE POSITION AND LOAD PARAMETER ESTIMATION

RELATED APPLICATION

The present application claims priority to U.S. Provisional Application 61/356,810, filed on Jun. 21, 2010, which is herein incorporated by reference in its entirety.

GOVERNMENT LICENSE RIGHTS

This invention was made with government support under ARL CRADA#11-12 awarded by the U.S. Army Research Laboratory. The government has certain rights in the invention.

BACKGROUND

1. Field of the Invention

Some embodiments of this invention relate to the field of autonomous navigation and load parameter estimation by Unmanned Aerial Vehicles (UAVs) by passively emitted Electro Magnetic Fields (EMFs) from power lines.

2. Discussion of Related Art

Current methods of UAV navigation can be characterized as active, in that the flight path is commanded by radio, or follows a planned route defined by waypoints and guided by an absolute position reference system like GPS. There have been attempts to navigate by power lines, with varied success. A recent paper [Moore, J. and Tedrake, R., "Powerline Perching with a Fixed-Wing UAV", Proceedings of the AIAA Infotech@Aerospace Conference, Seattle, Wash., April 2009] used a particle filter in conjunction with simulated magnetic fields to guide a UAV to a power line perch. Although based on magnetic field models, the method reduces a 3-phase circuit to a single magnetic dipole model, which discards much of the detail necessary to fly at close range to the lines. Locally generated underwater electromagnetic signals have been used for navigation of Autonomous Underwater Vehicles (AUVs) [Sanford, T., and Tyler, R., "Nearshore Navigation and Communication Based on Deliberate EM Signals", Applied Physics Laboratory, University of Washington, 2005], although the sensors used for this purpose are quite large and not appropriate for a UAV.

Therefore, there is a need for refinement of autonomous UAV navigation systems to support following the power lines to a predetermined destination with little or no a priori information about location of the lines within a power grid.

SUMMARY

In accordance with some embodiments of the present invention, a method is disclosed for providing autonomous navigation for an Unmanned Air Vehicle (UAV) in the vicinity of power lines, comprising: measuring the magnitude and phase of the magnetic field at an unknown location within a space under excitation by a set of power cables composing a power line, using one or more orthogonal magnetic sensors on a UAV; modeling a set of expected complex magnetic strengths of the set of power cables at the currently estimated position and orientation of the UAV, for one or more of the magnetic sensors, the set of expected magnetic field values corresponding to a model of the set of power cables; and estimating parameters related to the UAV position and orientation based on the residual error between the measured set of complex magnetic field values and the set of expected magnetic field values corresponding to a combined model of the set of power cables.

A related method is also disclosed for remotely estimating the power grid synchronized load parameters of the power cables from a UAV flying near an overhead power line, comprising: measuring the magnitude and phase of the magnetic field at an unknown location within a space under excitation by a set of power cables composing a power line, using one or more orthogonal magnetic sensors on a UAV; measuring the complex electric field voltage magnitude and phase at the same location using an electric field sensor on the UAV; referencing the phase of the magnetic field measurement(s) to the electric field measurement by performing a phase rotation; modeling a set of expected complex magnetic strengths of the set of power cables at the currently estimated position and orientation of the UAV, for one or more of the magnetic and electric field sensors, the set of expected magnetic field values corresponding to a model of the set of power cables; and estimating parameters related to the power factors and loads of each cable in the power line based on the residual error between the measured set of complex field values and the set of expected field values corresponding to a combined model of the set of power cables.

These and other embodiments are further discussed below with reference to the following figures.

Figure 1:
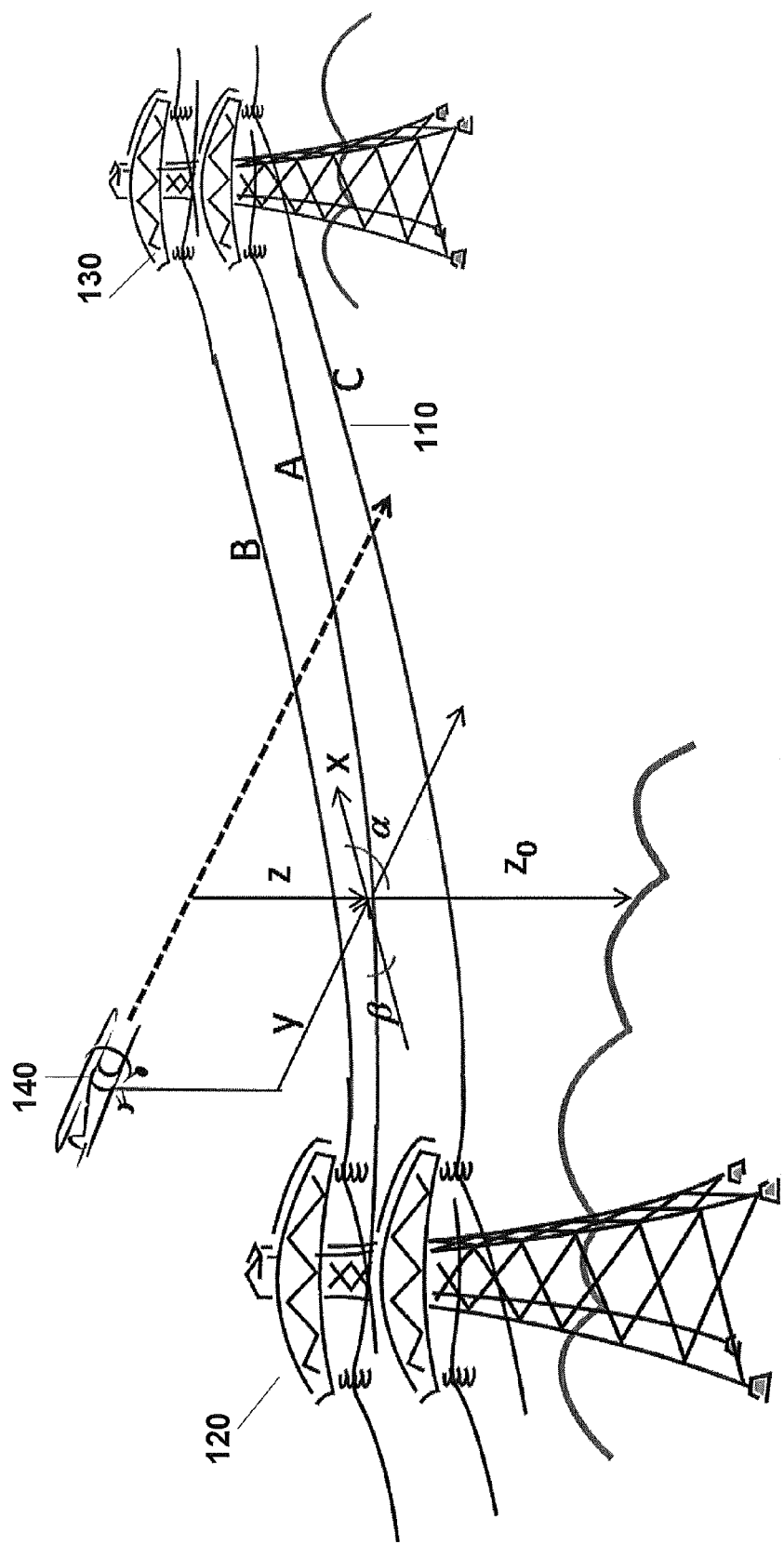
FIG. 1 illustrates a model of a UAV power line flyover, including the reference coordinate frame, according to some embodiments of the present invention.

In the figures, elements having the same designation have the same or similar functions.

DETAILED DESCRIPTION

Satellite-based navigation systems are not always available to UAVs operating in urban or hostile environments. In these situations, overhead AC power lines can provide a local reference for autonomous navigation. Electric and magnetic fields emitted from such lines are described by well-known physical models. When the goal is to follow a proscribed route in a power grid network, these models can provide a navigational framework for the UAV.

Alternatively when global positioning signals do exist, a model based approach permits data collection of the power grid structure by a UAV, as could be used for maintenance or detailed GIS mapping. Model based methods, which track the current, phase, and position of each conductor in a set of cables composed of one or more circuits, can also provide autopilot instructions that guide the UAV to perch on a single conductor for the purpose of charging internal batteries via inductive coupling. In some embodiments of the present invention, these tasks are enabled by forming a local two-dimensional reference frame centered on the power line. Based on 3-axis electromagnetic field measurements fused with inertial measurements, the UAV position is constantly updated using a non-linear estimation process. Embedded 3-d features (towers, intersections, catenaries, and direction changes), are detected when there is reduced correspondence between a 2-d model and 3-d field measurements. If available, previously collected grid layout and pole information can update the estimation process and help correct down-line position errors. To enable this model-based navigation method, an extremely sensitive, low-frequency, 3-axis magnetic field sensor is employed which is similar to an existing sensor used for underground cable mapping. The sensor noise floor is 5 pT Hz-½ at 50 Hz in a less than 150 gram package including signal conditioning and processing hardware. Each axis of the sensor, which is virtually immune to E-field interference, can be molded into the airframe. One or more differential electric field measurements are combined with the three magnetic field channels and integrated in a package that incorporates a precision multi-channel ADC and signal processing system.

An opportunity exists to enhance active navigation methods with alternatives that allow a UAV to autonomously determine its location relative to physical features in the environment. In accordance with some embodiments of the method, passive tracking of power line electromagnetic signals, i.e., signals that emanate from overhead AC powered transmission and distribution lines in the environment, can be performed. Embodiments of the present invention relate to a method and apparatus for autonomously navigating an Unmanned Air Vehicle (UAV) along or across an overhead power line using measurements of the emitted magnetic field for navigational guidance. Those fields can be utilized as a navigational aid when active navigation methods like GPS are unavailable, jammed, or inaccurate. Additionally, characteristics of the electrical load on the power lines can be remotely detected by the UAV. When coupled with simultaneous electric field measurements, these loads can be referenced to the voltage phase, so that the method can remotely estimate the power factors of each cable, and thus the overall load even if the circuit is unbalanced.

Tracking of aboveground power lines from a UAV is very similar to mapping of unseen underground cables. A body of work related to the precise location of underground or underwater utilities is very closely aligned with the aboveground power line tracking problem [e.g., Gudmundsson, T., and Waite, J., et al, "Precise Location of Buried Metallic Pipes and Cables In the Presence of Signal Distortion", U.S. Pat. No. 7,356,421 (the '421 patent), and Li, K., and Waite, J., et al, "Enhanced Precise Location", U.S. Patent Application No. 2009/0128156 (the '156 application), each of which is herein incorporated by reference in its entirety]. Underground cables (including power cables) are commonly traced using cable location receivers that sense the magnetic field emitted by current carrying conductors. The underground tracking model includes the possibility that multiple physically separated cables are all carrying the same, but phase shifted, signal that results from capacitive or inductive "bleedover". This occurs when cables lay parallel to each other in long conduits. Usually no information is available on the geometry of the underground conduit. The "precise location" methods allow a number of hypothesized cables to exist, each carrying some unknown level of AC current at an unknown phase.

Using the precise location methods, simultaneous, geometrically dispersed measurements are grouped together through a nonlinear least squares approach to derive a position estimate of the target cable. Alternatively, through a Kalman filtering approach as per [Waite, J., and Welaratna, R., "Sensor Fusion for Model-Based Detection in Pipe and Cable Locator Systems", U.S. Patent Application No. 2006/055584 (the '584 application), which is herein incorporated by reference in its entirety]., the methods can utilize sequential measurements as a magnetic antenna traverses the environment, but in this case phase continuity exists for each of the measurements that are combined. The precise location methods allow for auxiliary phase referencing methods, by transmitting the reference over a wireless channel, placing a modulated phase reference directly on the utility line by a compatible transmitter, or simply freezing the local clock relative to the transmitter clock during the traverse. In the latter case, a simple linear phase ramp can be removed from the measured data to prior to the analysis.

With a different phase reference and other modifications, the underground cable precise location method can be adapted for detection, following, phase identification, and positioning of overhead power lines. The intra-cable geometry of overhead lines is more constrained than for underground cables, and hypothesis testing on the circuit configuration can greatly simplify the problem.

Additionally, by incorporating a simultaneous measurement of the electric field, the phase of the individual currents flowing in each cable of the power line circuit can be known relative to the power line grid timebase. Tracking the phase of the electric current carried by the lines (in addition to the current magnitude) support use of the new method as a remote sensing means to estimate load changes or power factors on the line. The difference between the voltage and current phases are constantly estimated, similar to the disclosures noted in Hull, D., et al, "Method for Detecting and Classifying Loads on AC Lines", U.S. Pat. No. 7,701,196, which disclosed the use of unattended ground based sensors to estimate loads and other power parameters on power lines.

The power of the precise location methods comes from the over-determination of the system, i.e., there are typically many more measurements than unknowns in the algorithm. Using either batch optimization solvers (like Levenberg-Marquardt), or non-linear Extended Kalman Filters (EKF), the system solution (or state, in the case of an EKF) is based on conformance of the data to the system model. System convergence occurs when the system state, after transformation by the physical model, accurately represents the measured data.

Therefore, there is a need for refinement of autonomous UAV navigation systems to support following the lines to a predetermined destination with little or no a priori information about location of the lines within a power grid and no external navigation system is available; collecting GIS (Geographic Information System) map information about the power grid (positions of the line, locations of towers, intersections, and determining the circuit topology) when a global navigation system is present; and detecting the presence of AC power lines to avoid collisions; and remotely measuring power factors based on load currents in the power lines relative to the voltage applied to the lines by the power provider.

Precise tracking of AC power lines enables autonomous navigation of the UAV without outside references, making the approach attractive when external navigation systems are offline. Both the magnetic and electric fields are passively emitted from power transmission in the lines, i.e., a measurement system does not place a known or special signal on the lines for the purpose of detection and there are no external beacons or reference points beyond the power lines themselves or features related to the lines (towers, poles). Current methods of UAV navigation can be characterized as "active", in that the flight path is commanded by radio, or follows a planned route defined by waypoints and guided by an absolute position reference system like GPS. Embodiments of the invention that are described herein allow a UAV to autonomously determine its location relative to the power lines without use of a priori position reference information. Further, because individual lines within the multiple cables composing a power line are tracked, the same method can be used as a guidance system for the UAV to land and perch on the line while recharging batteries via electromagnetic induction.

Such precise cable location methods would provide estimates of the effective height of the UAV above each line, horizontal offsets to each line, and pitch/yaw angles of the UAV with respect to the set of cables composing a power line. Each of these tracked states is estimated along with a variance estimate, allowing higher level decisions by the autopilot or supervisory module to determine the validity of the position state. The method assumes a two-dimensional geometry for the lines, with the reference frame based on the line itself. Excursions from this model will indicate 3-d features like bends, sharp turns, intersections with other lines, the presence of towers (at the peak in the catenary), etc. These 3-d features can be used as down-line reference points as the UAV navigates along the line if their presence is known prior to the mission. If they are not known a priori, the positions of these 3-d features in the line can be annotated during a mission when satellite or other external navigational aids are available, and then made available in the UAV's memory for use as landmarks when external aids are not possible.

As described in the '421 patent and the '156 application, a single 3-axis magnetic field sensor can be used to collect field data over a segment of the magnetic field. The 2-d magnetic field models for multiple cables are based on the Biot-Savart Law (Eqns. 1 and 2), which relates the current flowing in a cable to the emitted magnetic field. The strength of the field around a long, straight cable falls inversely with distance. The parameters $a_i$ and $b_i$ are the Cartesian distances between the individual conductors in a particular power line geometrical configuration (and are members of the unknown parameter set), and the coordinate system is as in FIG. 1. For the horizontal line configuration shown in FIG. 1, $b_i$ is the distance between the horizontal lines A-C and A-B, and $a_i$ is zero.

$$h_{y,n} = \sum_i \frac{\mu_0 I_i}{2\pi} \left[ \frac{(z_{n,i} - a_i)}{(z_{n,i} - a_i)^2 + (y_{n,i} - b_i)^2} \right] \quad \text{(Equation 1)}$$

$$h_{z,n} = \sum_i \frac{\mu_0 I_i}{2\pi} \left[ \frac{(y_{n,i} - b_i)}{(z_{n,i} - a_i)^2 + (y_{n,i} - b_i)^2} \right] \quad \text{(Equation 2)}$$

FIG. 1 illustrates coordinate system X, Y, and Z relative to power lines 110 between towers 120 and 130. With reference to FIG. 1, the five unknowns for a 3-d sensor mounted on a UAV 140 present at an arbitrary point in the field are y, z, electric current I flowing in each 3-phase cable (denoted by phase A, B, or C) of cable 110, and the pitch β and yaw α angles of the sensor on UAV 140 to the line 110. The down-cable dimension x cannot be known because of the 2-d aspect of the field. Depending on the power line configuration, additionally 2-4 unknowns $a_i$ and $b_i$ exist. The distance vector as the UAV crosses the line is assumed known from the autopilot system, typically from a combination of an inertial measurement unit (IMU) and satellite navigation system. When absolute position references such as satellites do not exist or are jammed or otherwise unavailable, the power line itself can be taken as the position reference, such that IMU drift is reset to zero as the centerline is crossed, as disclosed in the '584 application.

When a phase reference is present, the electric current I can be treated as complex (having both magnitude and phase), which leads to another unknown (phase angle of the current). From the standpoint of optimization, the number of measurements is effectively doubled when processing the data in quadrature, so it often beneficial to include phase in the set of unknowns. Embodiments that determine the power line load factors treat the current as a complex quantity.

Utilizing the modeling process by using superposition, an arbitrary number of cables can be combined into a model of a multi-conductor underground conduit, or overhead power line circuit(s). A single 3-axis magnetic loop sensor traversed through the field provides the measurements from which a numerical optimization method can compute the model-based parameters, per the methods documented in the '421 patent and the '156 application.

Figure 2:
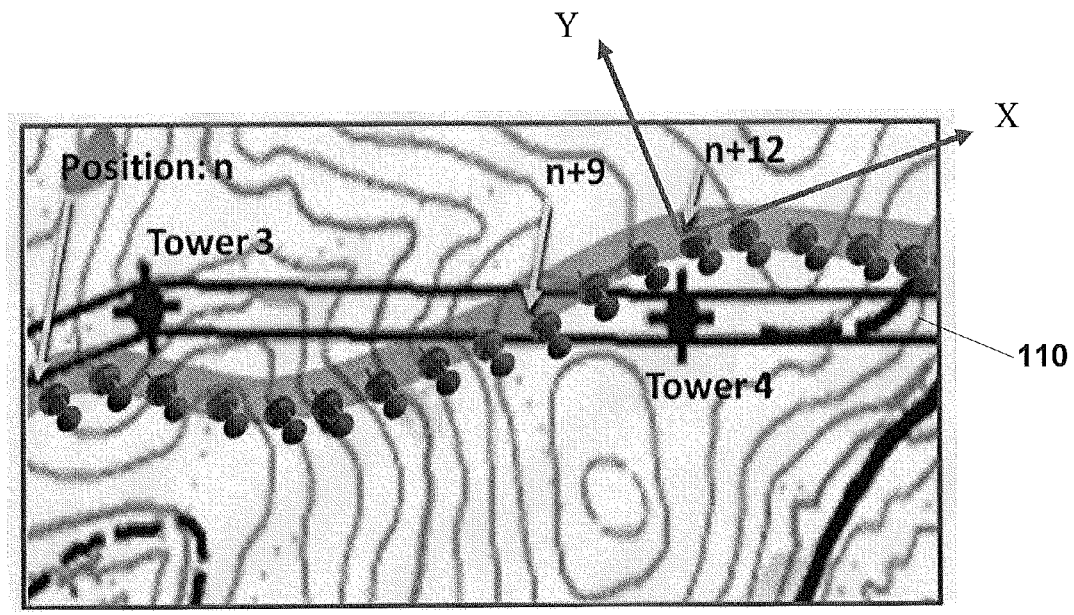
FIG. 2 illustrates a topographical map view of a UAV track as it autonomously follows a power line in some embodiments of the present invention.
Figure 3:
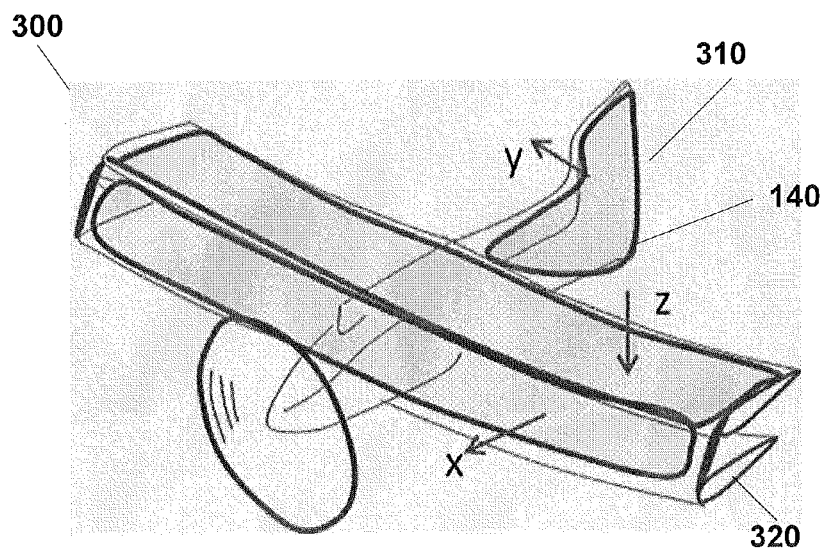
FIG. 3 illustrates an example of how to deploy the loop magnetic sensors in three orthogonal dimensions on a biplane UAV according to some embodiments of the present invention.

In FIG. 2, a UAV 140 collects repetitive measurements [n, n+1, . . . ] along an arbitrary track in the vicinity of a power line 110. FIG. 3 illustrates an example mounting configuration 300 for 3-axis magnetic field loop antennas on a small biplane UAV 140, essentially turning the UAV 140 into a flying antenna with no compromise in sensitivity on any axis because the loop cross-sectional area consumes the span of the entire airframe. As shown in FIG. 3, a y-axis antenna is formed on a tail section 310, a z-axis antenna is formed on the top surface of wing 320, and an x-axis antenna is formed on the front of wing 320. The geometry and direction of the UAV 140 with respect to the line 110 is arbitrary. At any point in the vicinity of a linear conductor carrying AC current, the phase of the magnetic field depends on many factors. The radiated magnetic field is a superposition of several concentric fields on each of three phases (and possibly multiple circuits). Each receiver is a highly directional magnetic dipole antenna and at the measurement points [n, n+1, . . . ], a wide variation in phases are to be expected. In fact this phase diversity is heightened through load imbalances on the three-phase cables, the reactivity of large loads on the line, and inductive coupling effects between the lines.

For overhead power lines, the electric field radially propagates from the lines. Power utility operators closely control the voltage amplitude and phase in the power grid. Although the E-field is not impacted by load variations, a combined measurement of the field from multiple power line conductors still has a complex character. On conductor i at a point (y,z), the field will exhibit magnitude according to the equation [Olsen, R., "Calculations of ELF Electric and Magnetic Fields In Air", Proceedings of EMF Engineering Review Symposium, Charleston, S.C., 28-29 Apr. 1998]:

$$u(y, z, i) = \frac{\rho}{2\pi\varepsilon_0} \ln\left[\frac{(z_{n,i} + a_i)^2 + (y_{n,i} - b_i)^2}{(z_{n,i} - a_i)^2 + (y_{n,i} - b_i)^2}\right] \quad \text{(Equation 3)}$$

In some embodiments, the charge ρ on the lines is taken as equal among the phases, but Eqn. 3 could be extended for a more general case of unequal charges. The phase due to conductor i will vary according to:

$$v_{A,n,i}(t) = u(y,z,i)\cos(2\pi ft)$$

$$v_{B,n,i}(t) = u(y,z,i)\cos(2\pi ft - 2\pi/3)$$

$$v_{C,n,i}(t) = u(y,z,i)\cos(2\pi ft - 4\pi/3) \quad \text{(Equation 4)}$$

where f=50 or 60 Hz. The position of the power lines with respect to the UAV 140 passing overhead is represented by z and y in these equations.

Taken together, Equations 1, 2, 3, and 4 represent a model for the method described herein. The models for both the H-field and E-field are 2-dimensional, while the measurements are 3-d to support off-axis flyovers with pitch and yaw (β, α per FIG. 1), as well as to capture non-2d effects. The residuals in the modeling process can be used to detect the existence of structure in the field, and the measured 3-d signature often lead to judgments about the down-line (x-direction) location of the UAV 140. For example, crossing a power pole creates a 3-d aberration in the H-field that can be picked up by monitoring the residuals in the modeling process.

The power grid phase reference for the time t in Eqn. 4 is kept relatively constant by the grid operator (typically within about a milli-Hz drift over one second), but is asynchronous from the local processing timebase that is often the same as the Analog-to-Digital Converter (ADC) clock on the UAV 140. Since the three electric field measurements and three magnetic field measurements are all measured on the same ADC timebase, all line phases share the same offset to the grid timebase. This single phase offset value is derived from the E-field modeling process.

Figure 4:
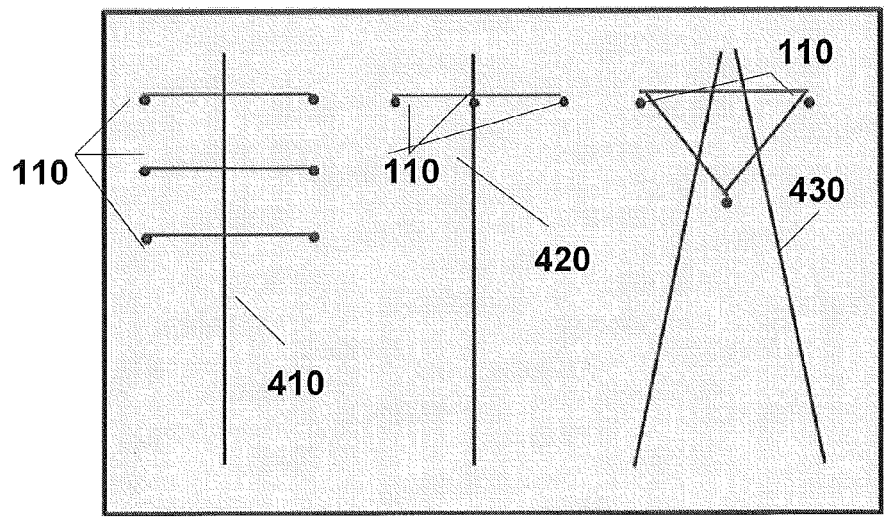
FIG. 4 illustrates typical aboveground 3-phase circuit topologies for vertical, horizontal, or delta-configuration power line geometries.

FIG. 4 illustrates three potential configurations of power line 110. A vertical 410, horizontal 420, and delta 430 configuration is indicated. In each case, power line 110 includes three lines having three phases as discussed above. Field models appropriate for each configuration are consistent with the above discussion. Vertical configuration 410 is an example of a double 3-phase circuit.

Figure 5:
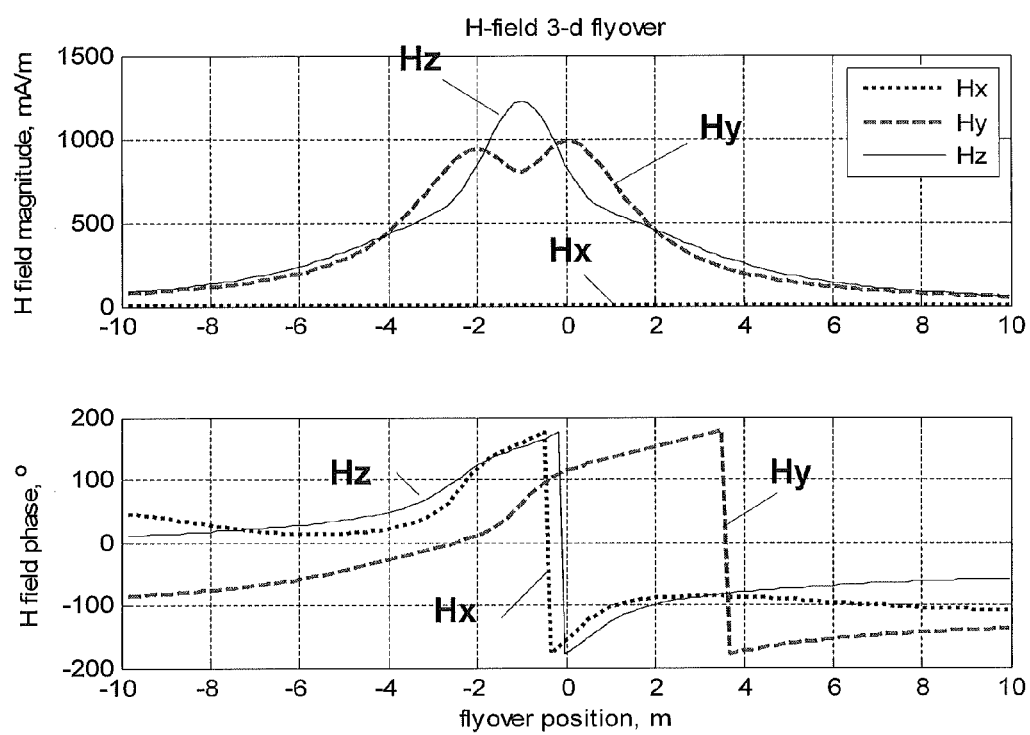
FIG. 5 shows an exemplary plot of the magnetic field magnitude and phase measured as the UAV crosses over a three-phase power line on a perpendicular path.
Figure 6:
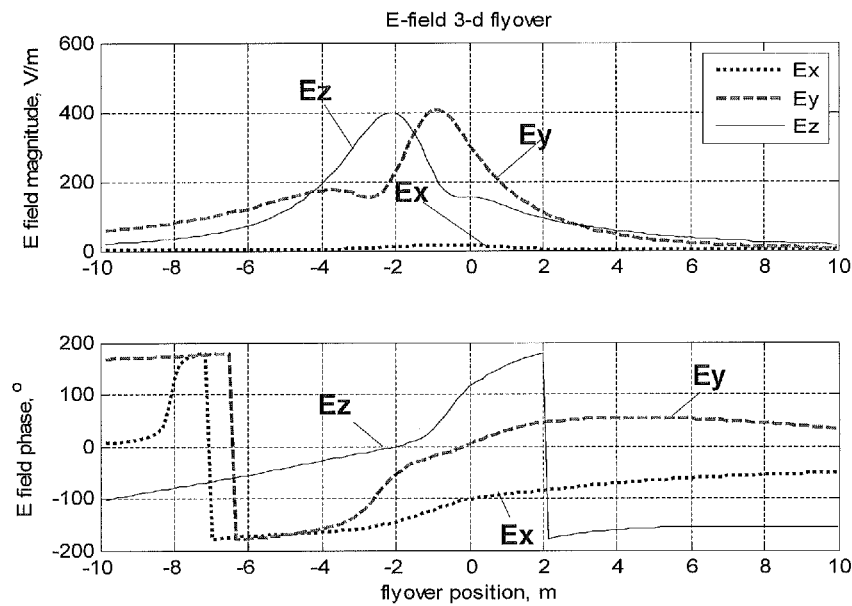
FIG. 6 shows an exemplary plot of the electric field magnitude and phase measured as the UAV crosses over a three-phase power line on a perpendicular path.

FIGS. 5 and 6 illustrate exemplary flyover amplitude and phase profiles of the H-field and E-field, respectively. The power line is a 3-phase "delta" configuration 430, about 10 meters off the ground. The simulated micro UAV 14—is flying at 2 meters/sec and crosses the lines perpendicularly at an elevation of 12 meters. Clearly, the profiles present a complex structure from which the model-based method decomposes into the physical state of the system (position, electric current in each line, charge, and phase offset).

Because of the limited number of unknowns for the E-field model process the E-field antenna may not be sensitive in all 3-axes, as long as there is diversity in the electric field measurements along the path of the flyover. To ease the integration of the sensor in an airframe (FIG. 3), the easiest deployment is to mount a differential E-field sensor on the wings 320 of a small fixed-wing UAV 140.

Some embodiments of the invention solve first for the spatial position of the lines using the H-field equations (Eqn. 1 and 2), and then use the estimated line positions (y,z) as known quantities in the E-field model-based phase offset estimate using Eqns. 3 and 4. There are only two unknowns in the E-field process: average charge for all lines, and the overall phase offset between the local measurement system and the power grid timebase.

Other embodiments of the invention jointly estimate the line position, the average charge for all lines, and the overall phase offset between the local measurement system and the power grid timebase by using a combined model for the system composed of Eqns. 1-4.

In 3-phase power line configurations, there is no fixed rule for which of the three cables is assigned phase A, B, or C. FIG. 4 shows several such configurations. In a double circuit (consisting of two 3-phase circuits) 410, the phases are often transposed to reduce the amount of electromagnetic emissions away from the power line. Some embodiments test each possible configuration for minimum mean-square error. For a single 3-phase circuit, six possible combinations of phases are possible, and are tested for conformance to the estimated power line geometry. This hypothesis test is used to determine the correct phase assignment of the lines A, B, and C to the components of Eqn. 4, and may only happen occasionally since geometry and line configuration changes are slow compared to the field measurement rate.

Using the described sequential model estimation process (position estimates are relayed from the output of the H-field process to the input of the E-field process), the electric field has proven valuable to qualifying the electric current magnitude and phase that are derived from the magnetic field measurements. Especially when measurement noise is an issue, there is sometimes more than one valid model solution that results from the H-field modeling process. Since the E-field represents a completely separate physical behavior model for the system, it can be used to confirm the validity of the position estimates (y, z) and the estimated complex loads on each phase of the power line. Model error from the E-field optimization process will be excessively high if the tentative position and loads are incorrect. The correct solution results in constrained error for both models (Eqns. 1-4), and the thus the cable positions, electric current amplitude and phase, as well as the grid timebase phase offset are validated. In this way, the disclosed system autonomously estimates the loads and power parameters of the crossed lines, without attachment to the lines, or other external information.

Figure 7:
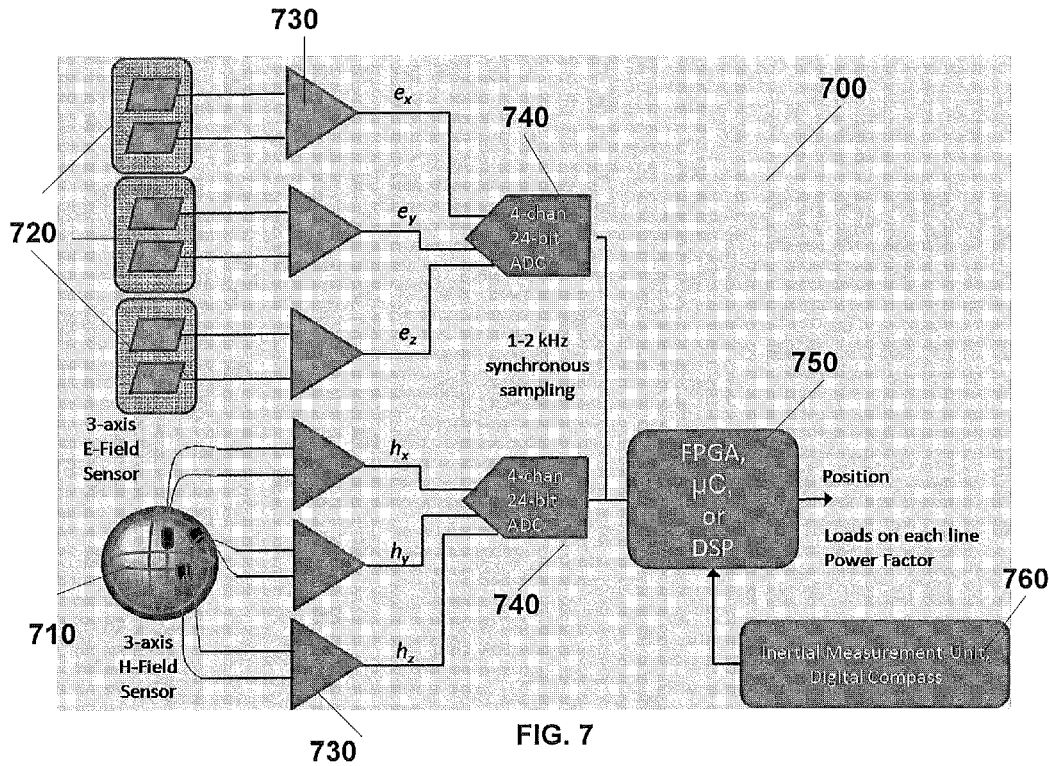
FIG. 7 illustrates an embodiment of a UAV hardware block diagram, including the sensor and signal processing system for a tri-axial magnetic sensor and tri-axial electric field sensor, according to some embodiments of the present invention.

The hardware block diagram of the processing system 100 utilized in some embodiments of the present invention is shown in FIG. 7. The six sensor channels (three orthogonal differential H-field sensors 710 and three differential E-field voltage sensors 720 interfaced to differential amplifiers 730) are sampled by a single 4-channel Σ-Δ ADC 740. Because of the low sampling frequency (1-2 kHz), high dynamic range is expected, up to 130 dB, with 24-bit sampling and digital filtering. Thus switchable or automatic gain stages are avoided, allowing precision measurements without complicated calibrations. The sampled data is read by a signal processing system 750, which may be FPGA based with an embedded soft-core microcontroller. An interface can be provided to a sensor package 760, which may include an inertial measurement unit (IMU), 3-axis digital compass, and other sensors associated with standard UAV autopilots.

Once a scan of data is present in the input buffers of processor 750, data is decimated and filtered according to methods disclosed in [Digital Signal Processing: mathematical and computational methods, software development, and applications", Jonathan M. Blackledge, Horwood Publishing, 2003, pp. 128-131]. Baseband quadrature demodulation and decimation filtering takes place at a mixer frequency of 50/60 Hz, so that the desired complex field data H(n) is present at the outputs, with noise outside of about a 1 or 2 Hz bandwidth rejected. Because the local processor clock is asynchronous with the power line grid frequency, a small frequency and phase offset will be present in the data at the output of the decimation filters. The frequency offset is constantly estimated by the hardware using a frequency offset estimator [Miller, K. S., and M. M. Rochwarger, 1972: "A covariance approach to spectral moment estimation", IEEE Trans. Info. Theory, IT-18, 588-596.], and updated on every sample. This maintains local clock alignment with the grid timebase to within about 10 µHz. The phase offset is estimated using the E-field model, as described above.

The Position Engine is a software component executed in processor 750 that implements the model-based positioning and load estimation method described above. It provides a continuous estimate of the location of the UAV with respect to the power lines 110. These estimates may then be used for avoidance, navigation along the power lines, mapping of the power lines, perching on a single conductor, or other purposes. The algorithms also estimate the magnitude and phase of the current in the lines, allowing for monitoring and remote, autonomous surveillance of electrical generation and consumption.

To accomplish this, a set of Kalman filters [see, for example Simon, D., "Optimal State Estimation: Kalman, H Infinity, and Nonlinear Approaches", Wiley-Interscience, 2006] continuously estimate the horizontal and vertical offsets from the power lines, the attitude of the UAV with respect to the lines, and the current magnitude and phase in each conductor. The filters are aided by measurements from the magnetic-field and electric-field sensors, as well as those obtained from the UAV's autopilot sensor suite.

When the line configuration (horizontal, vertical, delta, and many others) or transposition of phases is not known a priori, an algorithm determines which filter estimate is the most appropriate one of the individual based on signal-level thresholds and hypothesis tests; the latter based primarily on the covariance estimates filters.

Figure 8:
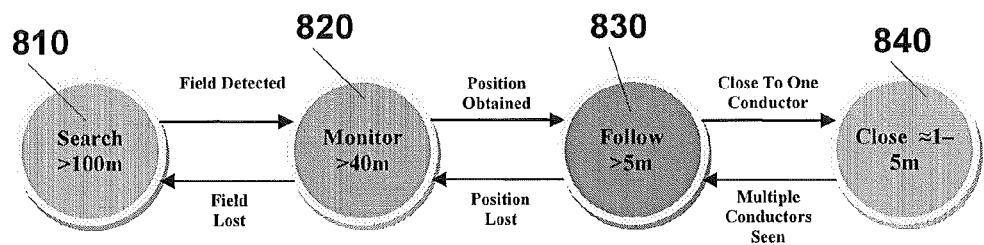
FIG. 8 illustrates the operation modes of the Position Engine shown in FIG. 7.

As shown in FIG. 8, at the top level there are four distinct modes of operation: Search 810, Monitor 820, Follow 830, and Close 840. The algorithms starts in the search mode 810, simply searching for field levels that are high enough to initiate the Kalman filters, and falls back to search mode 810 if field levels fall below that level again.

Once the UAV is close enough to the power lines to confidently recognize the fields, the algorithms transitions into Monitor Mode 820, whose purpose is to enable the navigation system to bring the UAV to the lines, and at the same time avoid coming too close.

While the algorithms are in Monitor Mode 820, a bank of Kalman filters runs in parallel, each operating with a model of a particular line configuration. When one of those shows enough confidence to estimate the details of the lines, the algorithms switch to Follow Mode 830. This provides estimates of the offsets from each conductor, as well as the current in each one.

Finally, if the UAV comes close to one of the conductors, such as for perching, the algorithms switch to Close Mode 840, where the focus is on accurate estimation of the proximity to that single conductor.

Figure 9:
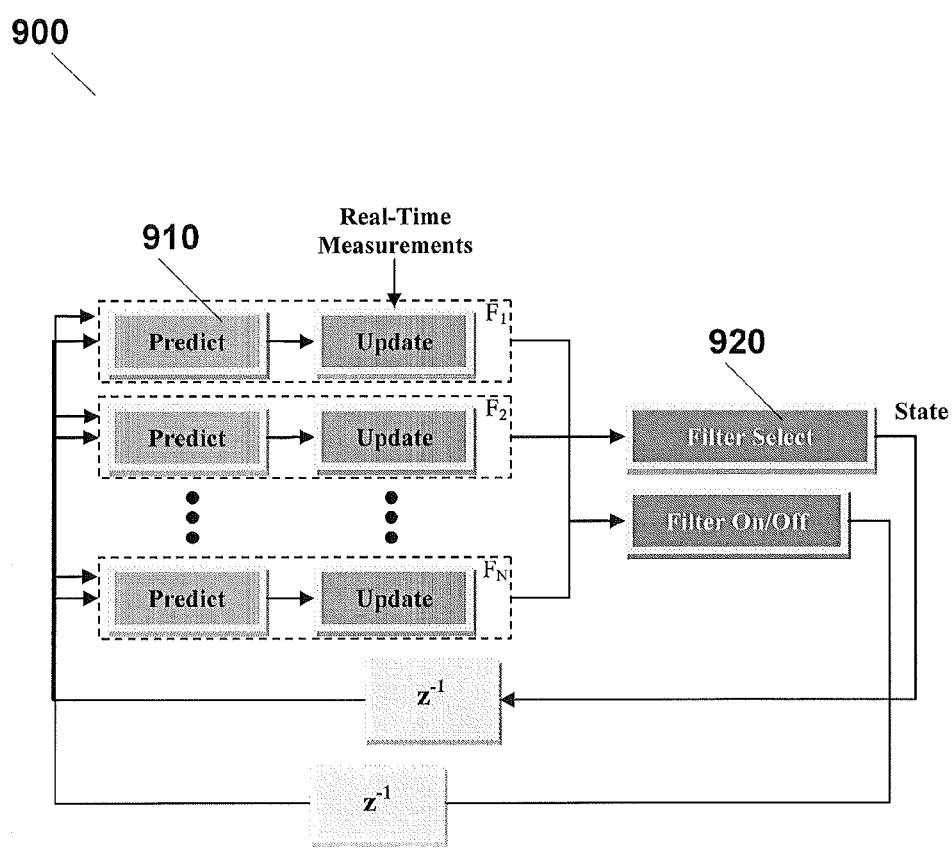
FIG. 9 illustrates a representative Kalman filter bank, used by the Position Engine in Follow mode.

While in Follow Mode 830, a small bank of Kalman filters 900 runs continuously, as illustrated in FIG. 9. As before, each filter 910 operates with a particular line configuration and provides estimates based on the a priori assumption that its configuration is the right one. Each configuration may have one or two parameters that need to be determined during the hypothesis test, such as the distance between conductors within a 3-phase circuit and the distance between circuits.

One filter is selected by filter select 920 based on a set of hypothesis tests to provide the state estimates actually used for navigation, but if that filter's confidence becomes too low, another one may be selected by filter select 920. In cases where the line configuration is known ahead of time, the selection may be predetermined and either only a single filter 910 may be running or others may run simply to validate that selection. Filters that end up having very low confidence may be turned off in order to free up compute resources.

In addition to selecting the right circuit configuration, the confidence of the currently selected filter is used to continuously monitor other changes, such as when passing over towers, line intersections and significant changes in the current on any conductor.

The structure of the currently selected Kalman filter depends on the mode of operation. As mentioned before, no Kalman filter is running while the algorithms are in Search Mode; only a detector that monitors the strength of the magnetic and electric fields measured by the sensors. This strength is then used to determine the appropriate time to switch to the next mode.

In Monitor Mode, a single Kalman filter is used to produce the state estimates (Table 1). The state is a simplified one compared to that used later and estimates only the direction to the power lines. The power lines are viewed as a single aggregate conductor, but because of relatively low field strength, reliable estimates of absolute offsets or current cannot be made.

TABLE 1

| Monitor Mode State Variables | Monitor Mode Measurements |
| --- | --- |
| y: Normalized horizontal offset<br>z: Normalized vertical offset<br>v: Yaw of UAV body relative to lines<br>ψ: Pitch of UAV body relative to lines | H: 3-dimensional magnetic field in body coordinates<br>v: 3-dimensional ground velocity from GPS or IMU estimates<br>$v_B$: Heading<br>$\psi_B$: Absolute pitch of UAV body<br>$\rho_B$: Absolute roll of UAV body |

$$\hat{y}_{k+1|k} = \frac{\hat{y}_{k|k} + \Delta y_k}{|\hat{y}_{k|k} + \Delta y_k|}$$

$$\hat{z}_{k+1|k} = \frac{\hat{z}_{k|k} + \Delta z_k}{|\hat{z}_{k|k} + \Delta z_k|}$$

$$\hat{v}_{k+1|k} = \hat{v}_{k|k}$$

$$\hat{\psi}_{k+1|k} = \hat{\psi}_{k|k}$$

(Equation 5)

$$\frac{\hat{H}_{k+1}}{\|\hat{H}_{k+1}\|} = T \begin{bmatrix} 0 \\ -\hat{z}_{k+1|k} \\ \hat{y}_{k+1|k} \end{bmatrix} \frac{1}{\hat{z}_{k+1|k}^2 + \hat{y}_{k+1|k}^2}$$

(Equation 6)

The state prediction equations are shown in Equations 5. The changes in offset, $\Delta y_k$ and $\Delta z_k$ are computed from the 3-dimensional ground velocity $v_k$ after rotating from earth coordinates to line coordinates through the latest heading, pitch and roll measurements along with the state estimates $\hat{v}_{k|k}$ and $\hat{\psi}_{k|k}$. The output Equation 6 is used for the update phase of the filter, based on the nonlinear equations for the magnetic field components after rotating into line coordinates. The rotation is done through the state estimates and as captured in the rotation matrix T.

Note that a 3-axis measurement at a single-point in space during the flyover has an inherent ambiguity in that two opposite directions result in measurements that only differ by a sign on all three sensors (x, y, z). This ambiguity is easily resolved over even a short period of time, since the signal strength will diminish if the UAV is moving in the wrong direction.

Once the signal strength is sufficient, the main bank of Kalman filters 900 will start up as described before and the algorithms will switch to Follow Mode 830. This provides much more detail about the configuration of the power lines, including the number of conductors, the horizontal and vertical offset from each conductor, the pitch and yaw of the lines relative to the UAV body, and the current magnitude and relative phase of each conductor. The Kalman filter state (Table 2) captures the horizontal and vertical offsets to one of the topmost conductors and uses the configuration estimate to model the others, while the current magnitude and phase are maintained separately for each conductor.

TABLE 2

| Follow Mode State Variables | Follow Mode Measurements |
|---|---|
| y: Horizontal offset | H: 3-dimensional magnetic field in body coordinates |
| z: Vertical offset | E: Aggregate electric field |
| v: Yaw of UAV body relative to lines | v: 3-dimensional ground velocity from GPS or IMU estimates |
| ψ: Pitch of UAV body relative to lines | $v_B$: Heading |
| $I_p$: Magnitude of the current in conductor p | $\psi_B$: Absolute pitch of UAV body |
| $\Phi_p$: Phase of the current in conductor p | $\rho_B$: Absolute roll of UAV body |

The Follow Mode filter state variables and the real-time measurements used to update the state are shown in Table 2, where p is the index of one conductor; p=1, 2 . . . , N. Other measurements from the autopilot sensor suite may be used in conjunction with the filter estimates, such as GPS coordinates for mapping the power lines, but are not used directly to update the filters.

$$\begin{aligned} \hat{y}_{k+1|k} &= \hat{y}_{k|k} + \Delta y_k \\ \hat{z}_{k+1|k} &= \hat{z}_{k|k} + \Delta z_k \\ \hat{v}_{k+1|k} &= \hat{v}_{k|k} \\ \hat{\psi}_{k+1|k} &= \hat{\psi}_{k|k} \\ \hat{I}_{p,k+1|k} &= \hat{I}_{p,k|k} \text{ for } p = 1, 2, \ldots, N \\ \hat{\Phi}_{p,k+1|k} &= \hat{\Phi}_{p,k|k} \text{ for } p = 1, 2, \ldots, N \end{aligned}$$ (Equation 7)

$$\begin{aligned} \operatorname{Re}(\hat{H}_{k+1}) &= \sum_{p=1}^{N} T \begin{bmatrix} 0 \\ -\hat{z}_{k+1|k} \\ \hat{y}_{k+1|k} \end{bmatrix} \frac{\hat{I}_{p,k+1|k}}{\hat{z}^2_{k+1|k} + \hat{y}^2_{k+1|k}} \cos(\hat{\Phi}_{p,k+1|k}) \\ \operatorname{Im}(\hat{H}_{k+1}) &= \sum_{p=1}^{N} T \begin{bmatrix} 0 \\ -\hat{z}_{k+1|k} \\ \hat{y}_{k+1|k} \end{bmatrix} \frac{\hat{I}_{p,k+1|k}}{\hat{z}^2_{k+1|k} + \hat{y}^2_{k+1|k}} \sin(\hat{\Phi}_{p,k+1|k}) \end{aligned}$$ (Equation 8)

The state prediction for each filter in the filter bank 900 is shown in Eqns. 7. As before, $\Delta y_k$ and $\Delta z_k$ are computed from the 3-dimensional ground velocity $v_k$ after rotating from earth coordinates to line coordinates through the latest heading, pitch and roll measurements along with the state estimates $\hat{v}_{k|k}$ and $\hat{\psi}_{k|k}$. The output equations of Eqns. 8 are used for the update phase of each filter, again based on the nonlinear equations for the magnetic field components after rotating into line coordinates. The rotation is done through the state estimates $\hat{v}_{k|k}$ and $\hat{\psi}_{k|k}$ as captured in the rotation matrix T. The updated estimates $[\hat{y}\ \hat{z}\ \hat{v}\ \hat{\psi}\ \hat{I}_p\ \hat{\Phi}_p]^T_{k+1|k+1}$ are then computed through a regular comparison to the field measurements through a nonlinear version of the Kalman filter, such as the Extended Kalman Filter [Wan, E. A. and van der Merwe, R., "The Unscented Kalman Filter for Nonlinear Estimation", Adaptive Systems for Signal Processing, Communications, and Control Symposium, IEEE, 2000].

Finally, the Close-In Mode filter again focuses on a single conductor. It uses a Kalman filter similar to that of the Follow Mode, except that only one conductor is modeled and the update equation does not involve the phase of the current (Table 3).

TABLE 3

| Close Mode State Variables | Close Mode Measurements |
|---|---|
| y: Normalized horizontal offset | H: 3-dimensional magnetic field in body coordinates |
| z: Normalized vertical offset | v: 3-dimensional ground velocity from GPS or IMU estimates |
| v: Yaw of UAV body relative to lines | $v_B$: Heading |
| ψ: Pitch of UAV body relative to lines | $\psi_B$: Absolute pitch of UAV body |
| I: Magnitude of the current | $\rho_B$: Absolute roll of UAV body |

The state prediction equations are shown in Eqns. 9. As before, the change in offset, $\Delta y_k$ and $\Delta z_k$ are computed from the 3-dimensional ground velocity $v_k$ after rotating from earth coordinates to line coordinates through the latest heading, pitch and roll measurements along with the state estimates $\hat{v}_{k|k}$ and $\hat{\psi}_{k|k}$. The output equation (Eqn. 10) estimates the magnitude of each field component, indicated below by the absolute value symbol taken over a vector. The rotation is done through the state estimates $\hat{v}_{k|k}$ and $\hat{\psi}_{k|k}$ as captured in the rotation matrix T.

$$\begin{aligned} \hat{y}_{k+1|k} &= \hat{y}_{k|k} + \Delta y_k \\ \hat{z}_{k+1|k} &= \hat{z}_{k|k} + \Delta z_k \\ \hat{v}_{k+1|k} &= \hat{v}_{k|k} \\ \hat{\psi}_{k+1|k} &= \hat{\psi}_{k|k} \\ \hat{I}_{k+1|k} &= \hat{I}_{k|k} \end{aligned}$$ (Equation 9)

$$|\hat{H}_{k+1}| = \left| T \begin{bmatrix} 0 \\ -\hat{z}_{k+1|k} \\ \hat{y}_{k+1|k} \end{bmatrix} \frac{\hat{I}_{k+1|k}}{\hat{z}^2_{k+1|k} + \hat{y}^2_{k+1|k}} \right|$$ (Equation 10)

The embodiments described herein are examples only of the invention. Other embodiments of the invention that are within the scope and spirit of this disclosure will be apparent to those skilled in the art from consideration of the specification and practice of the invention disclosed herein. It is intended that the specification and examples be considered as exemplary only and not limiting. The scope of the invention, therefore, is limited only by the following claims.

What is claimed is:

1. A method for providing autonomous navigation for an Unmanned Air Vehicle (UAV) in the vicinity of power lines, comprising:
   measuring a set of complex magnetic field values of a magnetic field emitted by each of the power lines using one or more magnetic field sensors mounted on the UAV as the UAV is traversing the magnetic field at a position and an orientation relative to each of the power lines;

modeling, by a processor, a set of expected complex magnetic field values of the magnetic field when the UAV is at the position and the orientation relative to each of the power lines based on a first model of the power lines;

estimating an estimated position and an estimated orientation of the UAV relative to each of the power lines and magnitude and phase of current flowing in each of the power lines, based on a residual error between the measured set of complex magnetic field values and the set of expected complex magnetic field values corresponding to the first model of the power lines;

measuring a set of complex electric field values of an electric field emitted by each of the power lines using one or more electric field sensors mounted on the UAV;

modeling, by the processor, a set of expected complex electric field values of the electric field emitted by each of the power lines based on a second model when the UAV is at the position and the orientation and when the UAV is at the estimated position and the estimated orientation relative to each of the power lines;

updating the position and orientation based on the modeling of a set of expected complex electric field values;

estimating a phase offset of the current flowing in each of the power lines relative to a power grid timebase, based on a residual error between the measured set of complex electric field values and the set of expected electric field values corresponding to the second model of the power lines; and navigating the UAV using the parameters related to the position and the orientation of the UAV relative to each of the power lines.

2. The method of claim 1, further comprising:

estimating power grid synchronized load parameters of each of the power lines, wherein the power grid synchronized load parameters of each of the power lines includes amplitude and phase of voltage applied current to each of the power lines, and a phase offset between the current flowing in each of the power lines and the voltage applied to each of the power lines.

3. The method of claim 2, further comprising:

validating the position and the orientation of the UAV relative to each of the power lines, the magnitude and the phase of the current flowing in each of the power lines, positions of the power lines, the power grid synchronized load parameters, and the phase offset of the current flowing in each of the power lines relative to the power grid timebase, using the residual error between the measured set of complex electric field values and the set of expected complex electric field values corresponding to a combined model.

4. A method for estimating a location of an Unmanned Air Vehicle (UAV) in the vicinity of power lines and power grid synchronized load parameters of each of the power lines as the UAV traversing a magnetic field and an electric field emitted by the power lines, the method comprising:

measuring a set of complex magnetic field values of the magnetic field using one or more magnetic field sensors mounted on the UAV at a position and an orientation of the UAV relative to each of the power lines;

measuring a set of complex electric field values of the electric field of each of the power lines using one or more electric field sensors mounted on the UAV;

modeling, by a processor, a set of expected complex magnetic field values of each of the power lines when the UAV is at the position and the orientation relative to each of the power lines based on a first model of the set of power cables;

modeling, by the processor, a set of expected complex electric field values of each of the power lines using when the UAV is at the position and orientation relative to each of the power lines based on a second model of the power lines;

jointly estimating parameters related to 3-d position of each of the power lines relative to the UAV, complex electric current in each of the power lines, the power grid synchronized load parameters, and phase offset of current flowing in each of the power lines relative to a power grid timebase, based on a residual error between the measured set of complex magnetic field values and the set of expected complex magnetic field values, and a residual error between the measured set of complex electric field values and the set of expected complex electric field values corresponding to a combined model of the power lines; and navigating the UAV using the parameters related to the 3-d position and the orientation of the UAV relative to each of the power lines.

5. The method of claim 4, wherein embedded 3-d features of the power lines are detected when there is reduced correspondence between a 2-d model and 3-d field measurements, the embedded 3-d features including towers, intersections, catenaries, or direction changes.

6. A navigation system for an Unmanned Air Vehicle (UAV), comprising:

a plurality of electric field sensors configured to measure a set of complex electric field values of an electric field emitted by each of the power lines aboveground, the plurality of the electric field sensors being mounted on the UAV;

a plurality of magnetic field sensors configured to measure a set of complex magnetic field values of a magnetic field emitted by power lines aboveground, the plurality of magnetic field sensors being mounted along three substantially orthogonal directions on the UAV;

circuitry coupled to receive signals from the plurality of electric field sensors and the plurality of magnetic field sensors, and to provide quadrature signals indicating the set of measured complex electric field values and the set of measured complex magnetic field values;

a position and orientation autopilot for indicating position and orientation over ground of the UAV relative to each of the power lines as it traverses the magnetic field emitted by the power lines; and a processor coupled to receive the set of measured complex magnetic field values and the set of measured complex electric field values, and to calculate parameter values related to the position of each of the power lines, phase offset of current flowing in each of the power lines relative to a power grid timebase, and magnitude and phase of electric current flowing in each of the power lines;

wherein the processor includes software for performing the following:

modeling a set of expected complex magnetic field values of each of the power lines when the UAV is at the position and orientation relative to each of the power lines based on a first model of the power lines;

modeling a set of expected complex electric field values of the electric field emitted by each of the power lines based on a second model of the power lines when the UAV is at the position and the orientation and the estimated position and orientation relative each of the power lines;

jointly estimating parameters related to the position of the UAV relative to each of the power lines and the magnitude and phase of the electric current in each of the power lines, based on a residual error between the measured set of complex magnetic field values and the set of expected complex magnetic field values corresponding to the first model of the power lines, and a residual error between the measured set of complex electric field values and the set of expected complex electric field values corresponding to the second model of the power lines; and navigating the UAV using the parameters related to the position and the orientation of the UAV relative to each of the power lines.

7. The navigation system of claim 6, wherein the processor is further configured to estimate the power grid synchronized load parameters of each of the power lines, and wherein the power grid synchronized load parameters of each of the power lines includes amplitude and phase of voltage applied to each of the power lines, and a phase offset between the current flowing in each of the power lines and the voltage applied to each of the power lines.

8. The navigation system of claim 7, wherein the residual error between the measured set of complex electric field values and the set of expected complex electric field values corresponding to a combined model of the power lines is used to validate the position of the UAV relative to each of the power lines, magnitude and phase of the current flowing in each of the power lines, positions of the power lines, the power grid synchronized load parameters, and the phase offset of the current flowing in each of the power lines relative to the power grid timebase.

9. The method of claim 1, wherein the set of complex magnetic field values include magnitude and phase of the magnetic field, and wherein the set of complex electric field values include magnitude and phase of the electric field.

10. The method of claim 1, wherein any of the one or more magnetic field sensors and the one or more electric field sensors includes a 3-axis sensor being mounted along three substantially orthogonal directions on the UAV.

11. The method of claim 1, wherein the parameters related to the position and orientation of the UAV relative to each of the power lines include at least one of a horizontal offset, a vertical offset, a yaw angle of the UAV relative to each of the power lines, a pitch angle of the UAV relative to each of the power lines, and distance between two adjacent power lines.

12. The method of claim 1, wherein the first model relates the current flowing in each of the power lines to the emitted magnetic field.

13. The method of claim 1, wherein the position and the orientation of the UAV relative to each of the power lines used for modeling the expected complex magnetic field values are calculated by applying a numerical optimization method to a plurality of measurements by the magnetic field sensors.

14. The method of claim 1, wherein a Kalman filter is used to estimate the parameters related to the position and orientation of the UAV relative to each of the power lines.

15. The method of claim 2, wherein the second model calculates the magnitude and the phase of the emitted electric field.

16. The method of claim 1, wherein the distance between the UAV and the power lines is in a range from about 5 meters to 40 meters.

17. The method of claim 1, wherein a set of Kalman filters are used to estimate the parameters related to the position and the orientation of the UAV relative to each of the power lines, and the magnitude and phase of the current flowing in each of the power lines.

18. The method of claim 3, wherein the combined model includes a combination of the first and second models.

19. The method of claim 4, wherein the parameters related to 3-d position of the UAV relative to each of the power lines include at least one of a horizontal offset, a vertical offset, a yaw angle of the UAV relative to each of the power lines, a pitch angle of the UAV relative to each of the power lines, and distance between two adjacent power lines.

20. The navigation system of claim 6, wherein the parameters related to the position of the UAV relative to each of the power lines include at least one of a horizontal offset, a vertical offset, a yaw angle of the UAV relative to each of the power lines, a pitch angle of the UAV relative to each of the power lines, and distance between two adjacent power lines.

* * * * *